US012755470B2

(12) United States Patent
Maros et al.

(10) Patent No.: US 12,755,470 B2
(45) Date of Patent: Oct. 6, 2026

(54) THREE-DIMENSIONAL SYNTHETIC IMAGE GENERATION WITH DIFFUSION MODELS FOR ORGAN SEGMENTATION MODEL TRAINING

(71) Applicant: GE Precision Healthcare LLC, Waukesha, WI (US)

(72) Inventors: Botond Bence Maros, Budapest (HU); László Ruskó, Budapest (HU); István Megyeri, Szeged (HU)

(73) Assignee: GE Precision Healthcare LLC, Waukesha, WI (US)

( * ) Notice: Subject to any disclaimer, the term of this patent is extended or adjusted under 35 U.S.C. 154(b) by 175 days.

(21) Appl. No.: 18/784,416

(22) Filed: Jul. 25, 2024

(65) Prior Publication Data

US 2026/0030825 A1 Jan. 29, 2026

(51) Int. Cl.
*G06T 15/00* (2011.01)
*G06T 7/10* (2017.01)

(52) U.S. Cl.
CPC ................ *G06T 15/00* (2013.01); *G06T 7/10* (2017.01)

(58) Field of Classification Search
CPC ....... G06T 19/00; G06T 19/20; G06T 15/005; G06T 17/20; G06T 17/00; G06T 15/10; G06T 15/00; G06T 13/40; G06T 15/06; G06T 15/08; G06T 15/20; G06T 2219/2016; G06T 15/04; G06T 2210/41; G06T 1/20; G06T 19/006; G06T 7/337; G06T 7/50; G06T 7/74; G06T 2200/04; G06T 2207/10016; G06T 2207/30244; G06T 2219/024; G06T 2210/12; G06T 2210/21; G06T 7/70; G06T 2207/20084; G06T 1/60; G06T 13/20; G06T 7/20; G06T 2219/0004; G06T 2207/30004; G06T 7/12;
(Continued)

(56) References Cited

U.S. PATENT DOCUMENTS

2008/0075348 A1 * 3/2008 Rappaport .............. G06F 18/28 382/209
2019/0198156 A1 6/2019 Madani et al.
(Continued)

OTHER PUBLICATIONS

Stojanovski et al., "Echo From Noise: Synthetic Ultrasound Image Generation Using Diffusion Models for Real Image Segmentation," arXiv:2305.05424v2, Aug. 15, 2023, 11 pages.

*Primary Examiner* — Gordon G Liu

(57) ABSTRACT

Systems, apparatus, instructions, and methods for model generation and deployment are disclosed. An example system includes: memory and processor circuitry to at least: train a first diffusion model using a first set of images; fine-tune the first diffusion model using a set of contours to form a second diffusion model; generate synthetic image patches using the second diffusion model and at least one contour; train a segmentation model using the synthetic image patches; and deploy the segmentation model to inference on a second set of images. Another example apparatus includes: a first diffusion model trained using a first set of images; a second diffusion model formed from the first diffusion model tuned using a set of contours, the second diffusion model to generate synthetic image patches using at least one contour; and a segmentation model trained using the synthetic image patches and deployed to inference on input images.

17 Claims, 8 Drawing Sheets

(58) Field of Classification Search
CPC .......... G06T 2207/10088; H04N 23/57; H04N 23/90; H04N 23/64; H04N 23/611; H04N 23/635; H04N 7/147; H04N 7/157; H04N 13/344; H04N 13/383; G06F 16/51; G06F 21/602; G06F 3/013; G06F 3/012; G06F 3/011; G06F 3/017; G06F 3/167; G06V 20/20; G06V 10/25; G06V 2201/07; B33Y 50/00; H04R 25/70; H04R 2225/77; G07T 2207/10081
USPC .......................................................... 345/419
See application file for complete search history.

(56) References Cited

U.S. PATENT DOCUMENTS

| | | | | |
|---|---|---|---|---|
| 2019/0332900 | A1* | 10/2019 | Sjolund | G16H 20/30 |
| 2020/0372635 | A1* | 11/2020 | Veidman | G06T 7/143 |
| 2021/0019863 | A1 | 1/2021 | Kaethner et al. | |
| 2025/0336523 | A1* | 10/2025 | Anand | G16H 10/60 |

* cited by examiner

| | LENSES | LACRIMALS | EYES | SUBMANDIBULARS | CHIASMA | OPTIC NERVES | BRAIN STEM | PITUTITARY | PAROTIDS | ORAL CAVITY | MANDIBLE | WHOLE BRAIN | SPINAL CORD SUP | HEAD BODY | AVERAGE |
|---|---|---|---|---|---|---|---|---|---|---|---|---|---|---|---|
| REAL | 77.58 | 69.96 | 92.11 | 86.09 | 76.12 | 79.18 | 94.04 | 75.81 | 78.83 | 90.67 | 87.24 | 97.69 | 92.88 | 97.25 | 85.39 |
| SYNTHETIC | 80.82 | 70.61 | 92.96 | 87.03 | 78.35 | 79.58 | 94.54 | 77.26 | 81.31 | 91.02 | 88.62 | 97.87 | 92.61 | 97.43 | 86.42 |

THREE-DIMENSIONAL SYNTHETIC IMAGE GENERATION WITH DIFFUSION MODELS FOR ORGAN SEGMENTATION MODEL TRAINING

FIELD OF THE DISCLOSURE

This disclosure relates generally to image generation and, more particularly, to synthetic image generation.

BACKGROUND

The statements in this section merely provide background information related to the disclosure and may not constitute prior art.

Automated segmentation models are popular tools that improve a clinician's productivity by allowing them to spend less time on manual labor, such as drawing organ contours by hand for each patient, etc. The clinician can instead focus on more important parts of patient treatment. These segmentation models are usually supervised deep learning-based algorithms, which require a large volume of manually contoured data for training. To identify, gather, inspect, and process enough labeled data is challenging and time consuming.

DETAILED DESCRIPTION OF CERTAIN EXAMPLES

Figure 1:
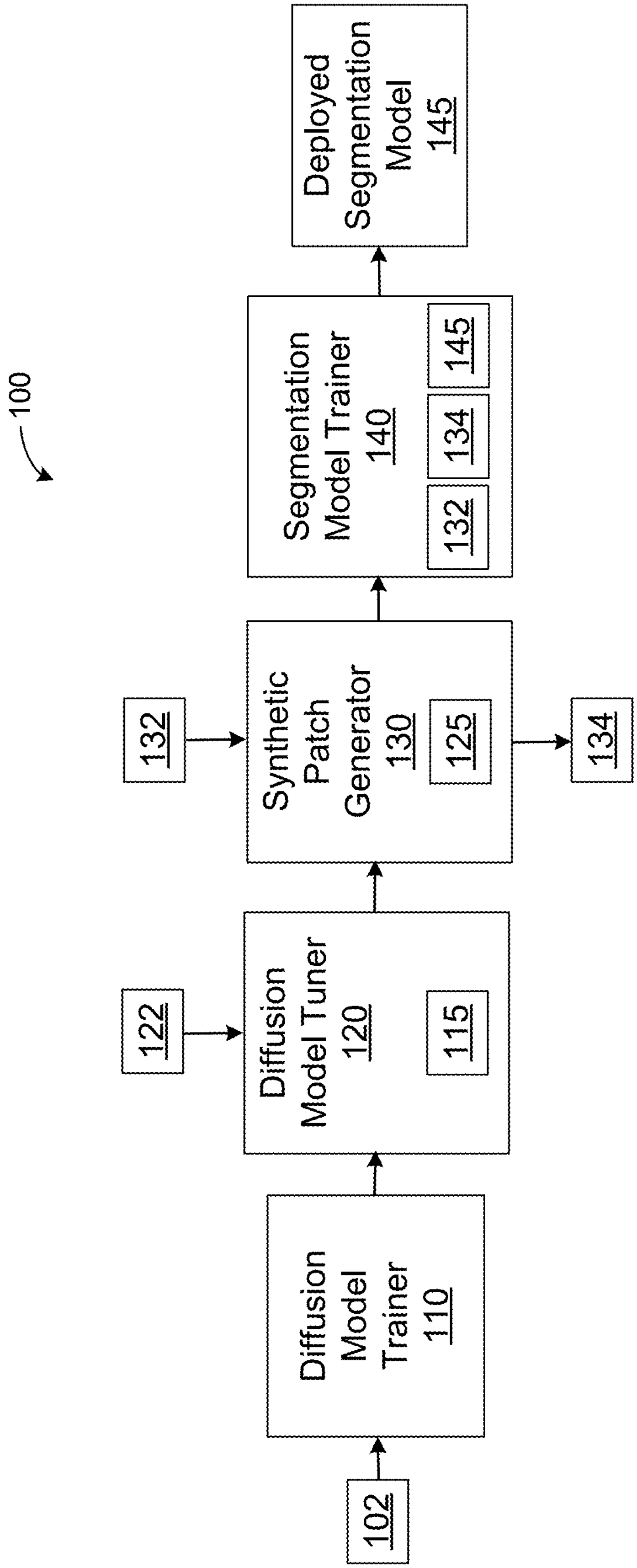
FIG. 1 is a block diagram of an example model generation system.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized and that logical, mechanical, electrical and other changes may be made without departing from the scope of the subject matter of this disclosure. The following detailed description is, therefore, provided to describe an exemplary implementation and not to be taken as limiting on the scope of the subject matter described in this disclosure. Certain features from different aspects of the following description may be combined to form yet new aspects of the subject matter discussed below.

When introducing elements of various embodiments of the present disclosure, the articles "a," "an," "the," and "said" are intended to mean that there are one or more of the elements. The terms "first," "second," and the like, do not denote any order, quantity, or importance, but rather are used to distinguish one element from another. The terms "comprising," "including," and "having" are intended to be inclusive and mean that there may be additional elements other than the listed elements. As the terms "connected to," "coupled to," etc. are used herein, one object (e.g., a material, element, structure, member, etc.) can be connected to or coupled to another object regardless of whether the one object is directly connected or coupled to the other object or whether there are one or more intervening objects between the one object and the other object.

As used herein, the terms "system," "unit," "module," "engine," etc., may include a hardware and/or software system that operates to perform one or more functions. For example, a module, unit, or system may include a computer processor, controller, and/or other logic-based device that performs operations based on instructions stored on a tangible and non-transitory computer readable storage medium, such as a computer memory. Alternatively, a module, unit, engine, or system may include a hard-wired device that performs operations based on hard-wired logic of the device. Various modules, units, engines, and/or systems shown in the attached figures may represent the hardware that operates based on software or hardwired instructions, the software that directs hardware to perform the operations, or a combination thereof.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

As used herein, when the phrase "at least" is used as the transition term in a preamble of a claim, it is open-ended in the same manner as the term "comprising" is open ended. In addition, the term "including" is open-ended in the same manner as the term "comprising" is open-ended.

The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects, and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities, and/or steps, the phrase "at least one of A or B" is intended to refer to implementations including any of (1) at least one A, (2) at least one B, and (3) at least one A and at least one B.

In addition, it should be understood that references to "one embodiment," "an embodiment," "one example,", "an example," "certain examples," etc., of the present disclosure are not intended to be interpreted as excluding the existence of additional embodiments/examples that also incorporate the recited features.

Certain examples provide systems and methods for synthetic image generation. For example, systems and methods are disclosed for synthetic three-dimensional (3D) image generation. More particularly, systems and methods are described for synthetic 3D image generation with diffusion models for deep learning-based organ segmentation model training, for example.

Traditional techniques require that contours be manually drawn for each case. Providing manually-contoured data for model training is very challenging, especially when the segmentation is intended to work on different types of input images (e.g., computed tomography (CT), longitudinal relaxation time-weighted magnetic resonance imaging (T1w MR), spin-spin relaxation time-weighted magnetic resonance image (T2w MR), ultrasound (US), etc.).

In certain examples, the deficiencies of the traditional techniques are addressed and improved upon by generating synthetic medical images from organ contours. Such synthetic medical images can be two-dimensional (2D) and/or 3D images, for example. In certain examples, 3D synthetic images are generated, such as 3D synthetic T1w MR images, etc. In certain such examples, one or more diffusion models are used with a control neural network model, such as ControlNet, etc., to generate synthetic image patches. Synthetic image patches (e.g., portions of an image 1-2 orders of magnitude smaller than full images, etc.) and associated organ contour(s) can then be used for a variety of applications, including training, etc., of segmentation models.

As used herein, synthetic or artificial indicates that the image or image patch is model-generated from random noise rather than based on an image obtained of a human or other patient. As such, a synthetic image is not an actual or real patient image because the synthetic image is generated by a trained model from random noise patterned after real images, and a real or actual image is obtained of a human or other patient (e.g., through capture of x-rays passing through the human patient and impinging on a detector to generate light intensity values and form an image, etc.). While certain examples generate a synthetic image to be indistinguishable from a real patient image, the source and process by which a synthetic image is generated versus a real obtained image is distinct and different.

Automated segmentation models are popular tools that automatically segment images, rather than forcing a clinician to draw organ contours by hand for each case to segment the corresponding image(s). Segmentation models are often supervised deep learning-based algorithms, which need lot of manually contoured data for training. Providing sufficient contoured data is very challenging when the segmentation is intended to work on different types of input images (e.g., CT, T1w MR, T2w MR, US, etc.).

Certain examples generate synthetic 3D medical images or image patches (e.g., MR, CT, and/or US, etc.) from organ contours using a diffusion model. The generated synthetic images (and/or image patches) can be used to train supervised deep learning-based segmentation models. Generation and use of synthetic images reduces the need for manually-contoured real image data for a new input image type because the input contours can originate from another input image type. Furthermore, generation and use of synthetic images can improve the accuracy and robustness of the segmentation models because an unlimited number of synthetic images (and/or image patches) can be generated from a given contour. Existing contours can also be augmented to generate a new unlimited number of images for the contours (e.g., including normal contours such as organ contours, etc., and abnormal contours such as tumors, other anomalies, etc.). This approach results in faster development time and improved segmentation performance measured on real data. This approach also results in more robust segmentation models by leveraging non-existent data that cannot be found in the real work for training of the segmentation models. This also results in organ-at-risk (OAR) segmentation models with decreased risk of overfitting or biases introduced by limited datasets, for example.

As such, certain examples provide better-performing segmentation models. Certain examples provide more robust automated segmentation models that are less deceptive to outliers. Using such segmentation models reduces time to correct segmentation results, enabling more time to focus on the patient, for example.

For example, a large set of contoured images of a certain type (e.g., T2w MR images, etc.) can be used to develop a segmentation model for the same organs in a different type of image (e.g., T1w MR images, etc.). In the second type of images (e.g., T1w MR images, etc.), for example, only a small subset of the images may be manually contoured. An unconditional diffusion model, such as an unconditional Denoising Diffusion Probabilistic Model (DDPM), is trained with image patches using a large set of non-contoured images (e.g., T1w MR images, etc.). While the unconditional diffusion model can be trained without contours, a semantic diffusion model, for example, would require contoured images for training. The resulting DDPM model can generate new image patches (e.g., T1w MR image patches, etc.) from (random) noise. The DDPM is fine-tuned with another diffusion model (e.g., a ControlNet model, other conditional diffusion model, etc.), which adds additional guidance to the unconditional image generation. For example, organ contours (e.g., defined for small subset of T1w MR images, etc.) provide additional guidance to the DDPM. The resulting fine-tuned DDPM can generate a new image or patch (e.g., T1w MR image, image patch, etc.) from an input organ contour (and random noise). The model can be guided with the input organ contour to determine which part (patch) of the images is to be generated, and how the organs look in the image (e.g., the T1w MR image, etc.).

Using the fine-tuned DDPM, an unlimited number of synthetic image patches can be for a given (e.g., input) organ contour and/or other input type, which were defined in another image domain (e.g., T2w MR, etc.). One or more segmentation models are trained on the synthetic image patches and the underlying input contour(s). Organ segmentation models can learn from the synthetic image patches and then they can inference (create automated organ segmentations) for whole images (not just patches).

As such, in certain examples, image generation is controlled using organ and/or other contour(s). Synthetic image patches (e.g., synthetic or artificially-generated image portions 1-2 orders of magnitude smaller than an entire image, etc.) are generated based on an input organ contour. The synthetic image patches and contours are then used to train organ segmentation models. This approach reduces the need for manually contoured real image data for a new input image type because an unlimited number of synthetic image patches can be generated from a given contour. Existing contours can also be adjusted by augmenting them and generating a new set of image patches for the augmented organ contours. To overcome the computational burden of generating a whole, complete set of images (e.g., a complete head and neck magnetic resonance imaging case, etc.), image patches (e.g., of size 64×128×128 pixels, etc.) from random noise and one or more organ contours. The synthetically-generated image patches are good substitutes for the real whole images, while requiring much less storage space and processing power, as a segmentation network model trained on the synthetic image patches can outperform a segmentation network model trained on real images (e.g., since a greater number of synthetic image patches can be generated, etc.). Additionally, dividing model training into two stages enables a first, larger set of image without contours to first be used, followed by a second, smaller set of images with contours, which saves on storage required as well as time/speed of model development, for example.

Machine learning techniques, whether a deep learning network or other experiential/observational learning system (referred to more generally as artificial intelligence or AI), can be used to characterize and otherwise interpret, extrapolate, conclude, and/or complete acquired medical data from a patient, for example. Deep learning is a subset of machine learning that uses a set of algorithms to model high-level abstractions in data using a deep graph with multiple processing layers including linear and non-linear transformations. While many machine learning systems are seeded with initial features and/or network weights to be modified through learning and updating of the machine learning network, a deep learning network trains itself to identify "good" features for analysis. Using a multilayered architecture, machines employing deep learning techniques can process raw data better than machines using conventional machine learning techniques. Examining data for groups of highly correlated values or distinctive themes is facilitated using different layers of evaluation or abstraction.

The term "deep learning" is a machine learning technique that utilizes multiple data processing layers to recognize various structures in data sets and classify the data sets with high accuracy. A deep learning network (DLN), also referred to as a deep neural network (DNN), can be a training network (e.g., a training network model or device) that learns patterns based on a plurality of inputs and outputs. A deep learning network/deep neural network can be a deployed network (e.g., a deployed network model or device) that is generated from the training network and provides an output in response to an input.

The term "supervised learning" is a deep learning training method in which the machine is provided already classified data from human sources. The term "unsupervised learning" is a deep learning training method in which the machine is not given already classified data but makes the machine useful for abnormality detection. The term "semi-supervised learning" is a deep learning training method in which the machine is provided a small amount of classified data from human sources compared to a larger amount of unclassified data available to the machine.

The term "convolutional neural networks" or "CNNs" are biologically inspired networks of interconnected data used in deep learning for detection, segmentation, and recognition of pertinent objects and regions in datasets. CNNs evaluate raw data in the form of multiple arrays, breaking the data in a series of stages, examining the data for learned features.

A generative model is an unsupervised learning model that processes data to determine or "learn" a data distribution of a training set from which the generative model can generate additional data points including variation from the training data set. The generative model models a distribution that is as similar as possible to the true data distribution of the input data set. Example generative models include a variational autoencoder (VAE), generative adversarial network (GAN), etc.

For example, a VAE tries to maximize a lower bound of a data log-likelihood, and the GAN tries to achieve an equilibrium between generator and discriminator. The VAE provides a probabilistic graph model to learn a probability distribution of the data input to the generative model (e.g., the training data set). Latent variables inferred from the data by the VAE model can be assumed to have generated the data set and can then be used to generate additional data such as to enlarge the data set, impute missing data from a time series, etc.

A GAN employs a game theory-style approach to find an equilibrium between a generator network and a discriminator network, for example. A generator network model learns to capture the data distribution, and a discriminator network model estimates a probability that a sample came from the data distribution rather than from a model distribution. In an inferencing mode, the GAN can generate similar data.

A diffusion model, also referred to as a diffusion probabilistic model or a score-based generative model, is a type of latent variable generative model. A diffusion model includes three main elements: a forward process, a reverse process, and a sampling process. A diffusion model learns a probability distribution for a particular data set from which the model can then sample new elements. The diffusion model learns the latent structure of a data set by modeling the way in which data points from the data set diffuse through the associated latent space. An unconditioned diffusion model is not trained on limits or labels such as organ contours, while a conditioned diffusion model (also referred to herein as a fine-tuned diffusion model) has been trained on organ contours, labels, etc.

As such, diffusion models can be used for image generation. In certain examples, the diffusion model is a denoising diffusion probabilistic model (DDPM), which adds variational inferencing and begins training with a forward diffusion process that begins at a starting point in a probability distribution to be learned and repeatedly adds noise to arrive at a distribution that closely approximates the original distribution. A backward diffusion process then outputs a vector and a matrix to undue the forward diffusion process. The diffusion model can then learn network model parameters associated with the probability distribution using maximum likelihood estimation with variational inference. In variational inferencing, a loss function is minimized by maximizing a lower bound on the likelihood of observed data. As described herein, the trained and deployed diffusion model can then process random noise to produce an ordered distribution (e.g., a synthetic 3D image patch).

Turning to the figures, FIG. 1 shows an example model generation system 100. The example model generation system 100 includes a diffusion model trainer 110, a diffusion model tuner 120, a synthetic image patch generator 130, and a segmentation model trainer 140. The model generation system 100 of FIG. 1 takes an input set of images 102 to train a diffusion model 115. The diffusion model tuner 120 tunes the unconditional diffusion model 115 using an additional input of organ contour(s) and/or other label(s) 122. The synthetic patch generator 130 uses the fine-tuned diffusion model 125 to generate synthetic 3D image patches 134. The synthetic 3D image patches 134 can be output for storage, aggregation, usage in training, etc., and can be provided to the segmentation model trainer 140. The synthetic 3D image patches 134 and input contour(s)/label(s) are used to train an image segmentation model 145, which is then deployed to segment images (e.g., 3D images, 2D images, etc.).

For example, the diffusion model 115 can be an unconditional diffusion model trained to generate MR image patches, such as 3D MR image patches, etc. In certain examples, the diffusion model trainer 110 uses head and neck T1w MR image volumes that are first minimum and maximum normalized (e.g., between 0 and 1, etc.) and then mapped (e.g., between −1 and 1, etc.) for diffusion model training. The 3D image volumes can also be divided into overlapping patches (e.g., 30-50 overlapping patches, etc.) of a certain size (e.g., 64×128×128, 32×64×64, etc.). The image volumes may be divided into such patches to be able to fit the model and the data into memory of a graphics processing unit (GPU), for example. The image volumes and resulting image patches do not have identified contours and may be random in terms of location. The diffusion model 115 is trained to generate a new synthetic 3D image patch from random noise. The diffusion model 115 generates volumes with a certain patch size (e.g., 32×64×64 voxels, 64×128×128, 128×256×256, etc.).

Figure 2:
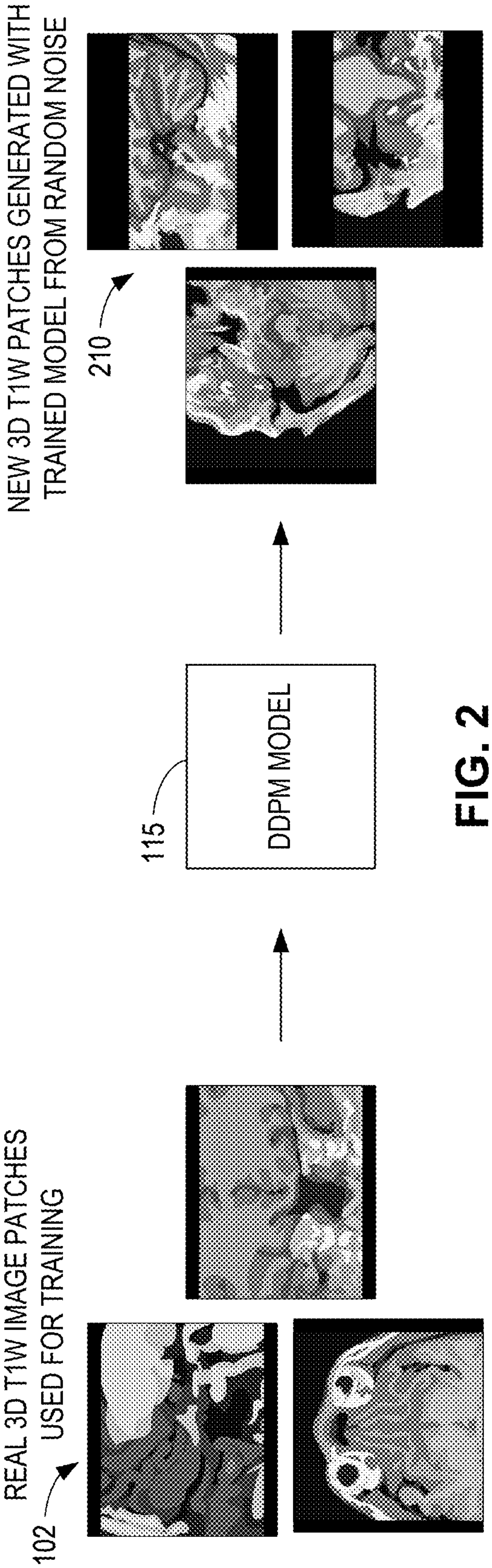
FIG. 2 shows an example in which a plurality of real images is used to train the unconditioned diffusion model of FIG. 1, which is then used to generate synthetic image patches from random noise.

For example, as shown in FIG. 2, a plurality of real images 102 is used to train the DDPM model 115. The trained diffusion model 115 then generates synthetic/artificial image patches 210 from random noise applied to the model 115. As shown in the example of FIG. 2, the DDPM model 115 is trained using real, non-contoured 3D T1w image patches to generate new synthetic 3D T1w image patches from random noise.

The diffusion model 115 is provided to the diffusion model tuner 120. One or more organ and/or other contours/labels 122 is used by the diffusion model tuner 120 to tune the diffusion model 115. For example, a ControlNet diffusion model tuner adds further guidance (e.g., additional conditions) to the diffusion model 115 for image generation. The diffusion model 115 plus the added contour/label-driven diffusion model form a fine-tuned diffusion model 125 that can be trained with a multi-organ label mask or contour (e.g., 8, 9, 10 organs, etc.) provided by or generated from the input 122, for example. Label maps provide images with contours (e.g., MR images, x-ray images, US images, etc.). In certain examples, label maps are normalized (e.g., to [−1, +1], etc.) and single channel. Augmentations such as random horizontal flip, random affine, random elastic deformation, etc., can be used by the diffusion model tuner 120 to train the hybrid diffusion model 125, for example.

Figure 3:
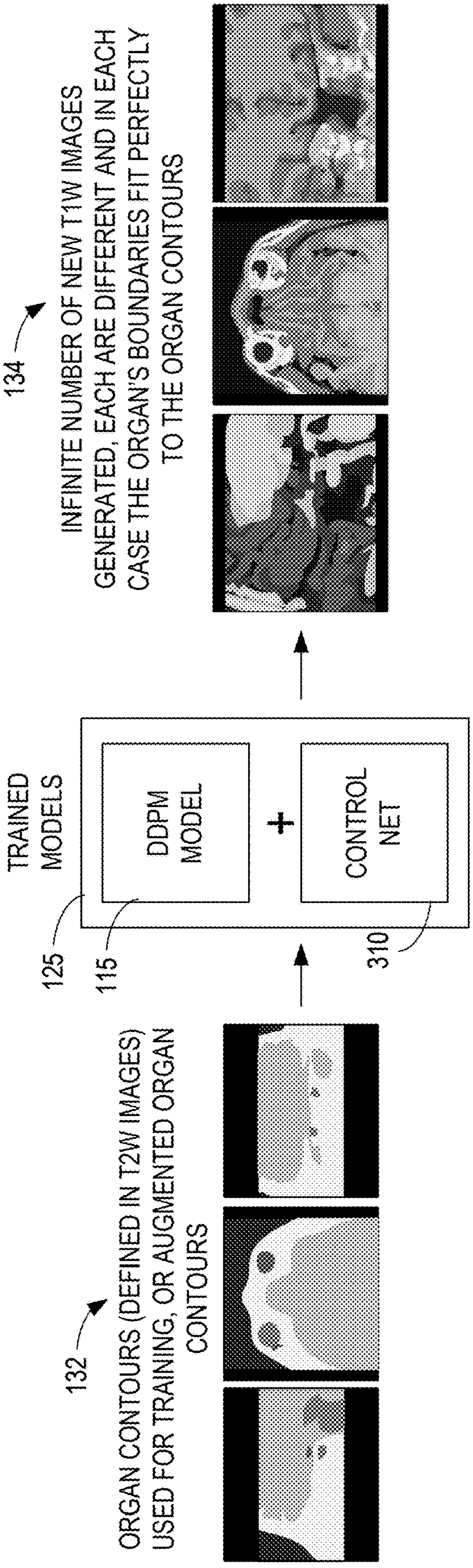
FIG. 3 shows an example in which organ contours are provided to fine-tune the diffusion model with conditions to generate synthetic image patches from a contour and noise.

As shown in the example of FIG. 3, organ and/or other object contours 122 are provided to a combination of the unconditioned diffusion model 115 and a stable, conditioned diffusion model such as ControlNet 310. The hybrid model 125 formed from the combination of diffusion models 115, 310 and trained with the contours/labels 122 is then trained to generate image volumes 320 from the organ contours 122 and random noise. The fine-tuned diffusion model 125 is formed when the DDPM 115 is fine tuned with the conditioned diffusion model 310, such as a Control Net model, which adds extra guidance to the unconditional image generation. The conditioned stable diffusion model 310 adds the extra guidance of organ contours (defined for small subset of T1w MR images). The resulting algorithm can generate a new T1w MR image or patch from the input organ contour (and random noise). With this, the fine-tuned diffusion model 125 can be guided regarding which part (e.g., patch) of the images is to be generated, and how the organs appear in the T1w MR image.

Figure 4:
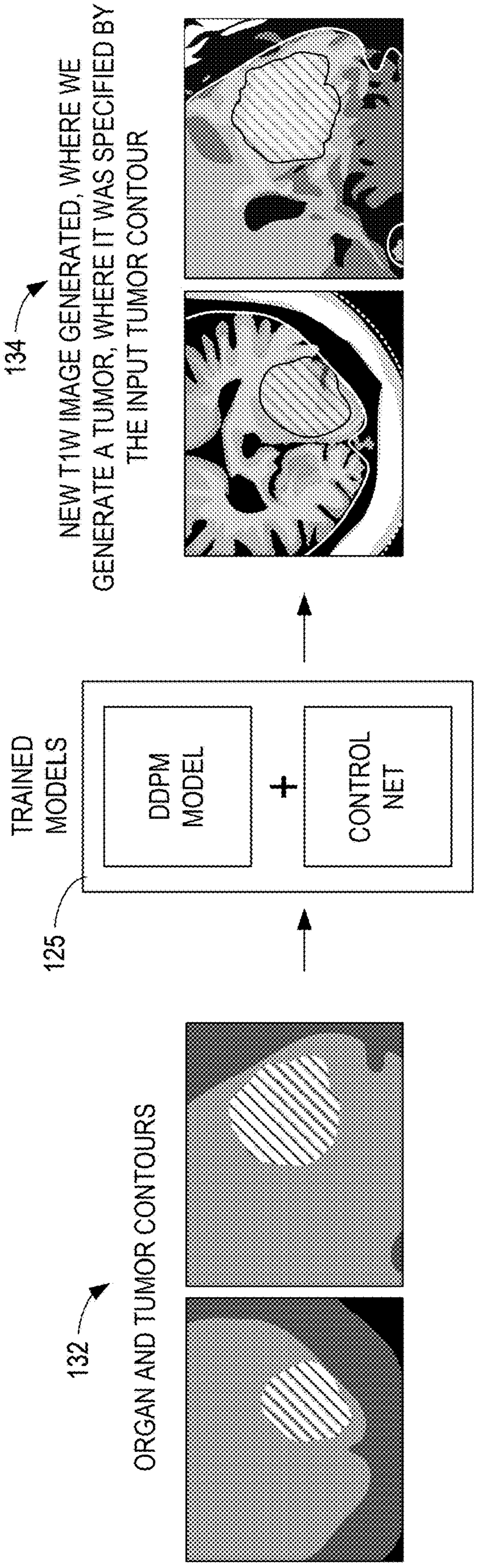
FIG. 4 provides another example of training the fine-tuned diffusion model to generate pathology cases.

FIG. 4 provides another example of training the fine-tuned diffusion model 125. In the example of FIG. 4, the diffusion model 125 is trained to generate pathology cases. For example, organ and tumor contours 122 can be provided (e.g., including whole brain contour, whole body contour, various organ contours, tumor location, etc.). Tumor size, shape, location, etc., can be modified to train the fine-tuned diffusion model 125. As such, a normal contour, such as an organ contour, bone contour, vessel contour, etc., and/or an abnormal contour, such as a tumor contour and/or other abnormality, etc., can be used to train the diffusion model 125.

For example, synthetic images can be generated from 9 organ contours using 10/25/34 labels, etc. A synthetic image can be generated from a precut label map without any augmentations, and then the label map can be augmented, such as with affine augmentation and with random elastic deformation. The augmented label map can then generate the synthetic images. As such, a multiple (e.g., 2×, 3×, 4×, etc.) of precut synthetic image patches can be generated from a set of precut organ labels, for example. In certain examples, real contours from a first modality can be used to generate contoured images (patches) for a second modality, and augmentation of the contours can be used to further increase data variety. The augmentation can incorporate a type of structure (e.g., normal, abnormal, etc.) because each type of structure can have a different type of augmentation (e.g., augmentation with abnormal structure (an abnormal contour) is different from augmentation with normal structure (a normal contour)).

The fine-tuned diffusion model 125 is provided to the synthetic patch generator 130 to generate synthetic 3D image patches according to a provided contour and/or label 132 (e.g., organ, organ part, bone, vessel, lymph node contour, abnormality (e.g. tumor, edema, aneurism, etc.), artifacts (e.g., tooth, hip implant, etc.), etc.). The synthetic 3D image patches 134 generated by the fine-tuned diffusion model 125 can be output for use in training other models, etc. The synthetic 3D image patches 134 are also provided to the segmentation model trainer 140. The segmentation model trainer 140 can train an organ segmentation model 145 using the synthetic 3D image patches 134 and associated contour/label information 132.

The segmentation model 145 can also be used to evaluate the quality of the synthetic 3D images generated by the fine-tuned diffusion model 125. That is, training the segmentation model 145 can be used to evaluate how convincing or appearing to be "real" are the synthetic 3D images generated by the fine-tuned diffusion model 125. The segmentation model trainer 140 trains one or more organ segmentation models 145 with both real and synthetic images and then measures an accuracy of the organ segmentation model 145 with respect to a validation set of real images (e.g., 18 cases having 9 organ contours, etc.) having the same organ contours as the training/testing set of both real and synthetic images/image patches (e.g., a missed set of 10/25/34 images for training and 3 for testing, having 9 organ contours, etc.).

Figure 5:
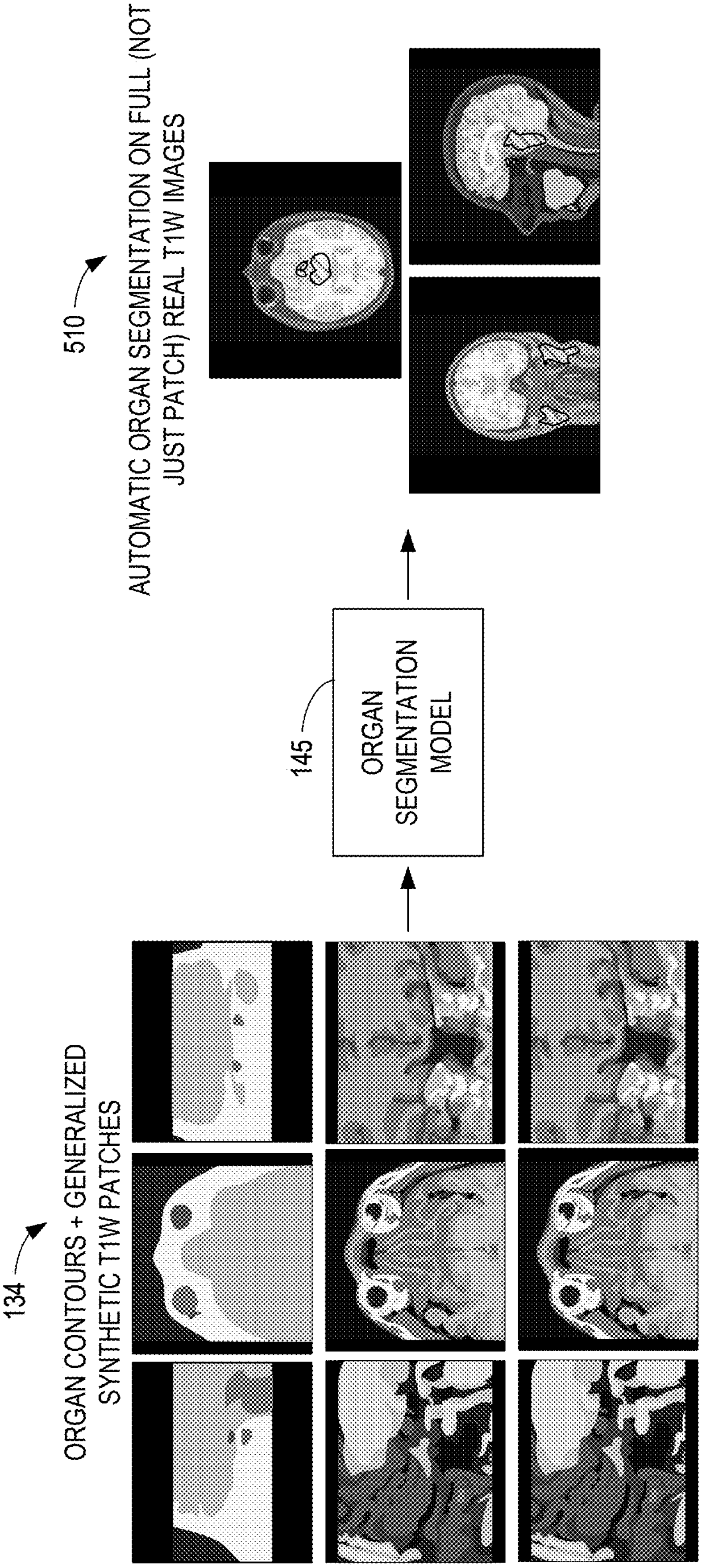
FIG. 5 shows an example implementation in which image patches generated by the fine-tuned diffusion model of FIG. 1 are used to train the organ segmentation model to generate images with organ segmentation.

FIG. 5 shows an example implementation in which the image patches 134 generated by the fine-tuned diffusion model 125 are used to train the organ segmentation model 145 to generate images 510 (e.g., full images and/or image patches) with organ segmentation. As such, the fine-tuned diffusion model 125 can be trained on image patches and can generate image patches to segment full 3D images, for example.

Figure 6A:
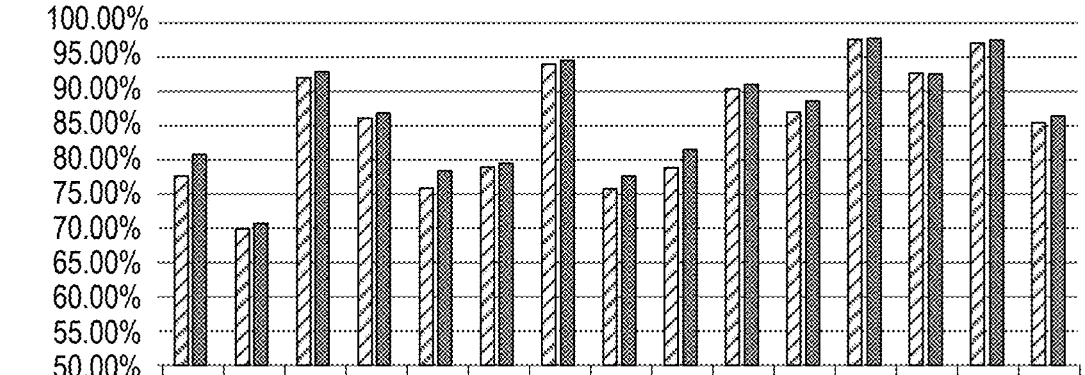
FIGS. 6A-6B provide experimental results verifying operation of an implementation of the segmentation model of FIG. 1 trained on synthetic image patches generated by the fine-tuned diffusion model.
Figure 6B:
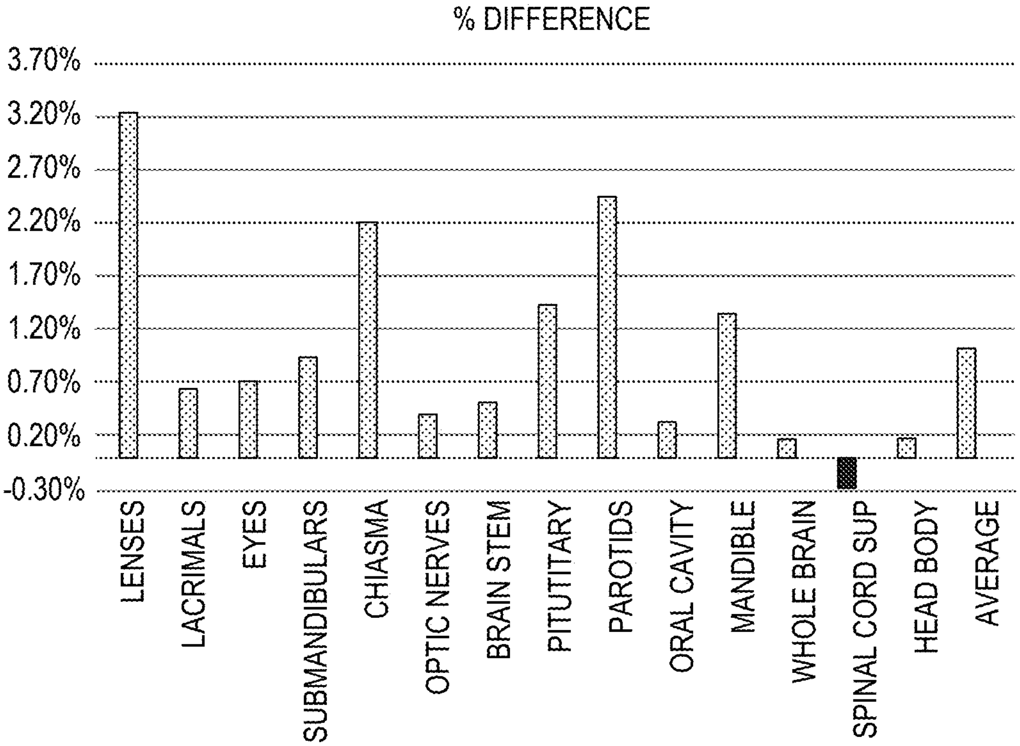

FIGS. 6A-6B provide experimental results verifying operation of an implementation of the segmentation model 145 trained on synthetic image patches 134 generated by the fine-tuned diffusion model 125. The same implementation of the segmentation model 145 was also trained on real images, and the tables of FIGS. 6A-6B compare their outcomes. The table shown in FIG. 6A compares operation of the segmentation model 145 to segment different organs in real images and in synthetic images. The table shown in FIG. 6B quantifies a difference in successful segmentation by the segmentation model 145. As shown in the example table of FIG. 6B (and FIG. 6A), when trained on the synthetic image patches 134, the segmentation model 145 was better able to correctly segment all organs/anatomical elements, with the exception of the spinal cord, than when the segmentation model 145 was trained on real images (e.g., +1.03%). As such, not only does the fine-tuned diffusion model 125 generate realistic 3D image patches 134, those patches 134 can be used to train a segmentation model 145 which is at least as accurate, if not more accurate, as a segmentation model trained on real data when identifying and segmenting images (e.g., 3D MR images, ultrasound images, X-ray volumes, etc.) correctly for one or more organ and/or tumor contours, labels, etc.

While example implementations are disclosed and described herein, processes and/or devices disclosed and described herein can be combined, divided, re-arranged, omitted, eliminated and/or implemented in any other way. Further, components disclosed and described herein can be implemented by hardware, machine readable instructions, software, firmware and/or any combination of hardware, machine readable instructions, software and/or firmware. Thus, for example, components disclosed and described herein can be implemented by analog and/or digital circuit(s), logic circuit(s), programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the components is/are hereby expressly defined to include a tangible computer readable storage device or storage disk such as a memory, a digital versatile disk (DVD), a compact disk (CD), a Blu-ray disk, etc. storing the software and/or firmware.

Flowcharts representative of example machine readable instructions for implementing components are disclosed and described herein. In the examples, the machine readable instructions include a program for execution by a processor. The program may be embodied in machine readable instructions stored on a tangible computer readable storage medium such as a CD-ROM, a floppy disk, a hard drive, a digital versatile disk (DVD), a Blu-ray disk, or a memory associated with the processor, but the entire program and/or parts thereof could alternatively be executed by a device other than the processor and/or embodied in firmware or dedicated hardware. Further, although the example program is described with reference to flowchart(s), many other methods of implementing the components disclosed and described herein may alternatively be used. For example, the order of execution of the blocks may be changed, and/or some of the blocks described may be changed, eliminated, or combined. Although the flowchart(s) depict example operations in an illustrated order, these operations are not exhaustive and are not limited to the illustrated order. In addition, various changes and modifications may be made by one skilled in the art within the spirit and scope of the disclosure. For example, blocks illustrated in the flowchart may be performed in an alternative order or may be performed in parallel.

As mentioned above, the example process(es) can be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example process(es) can be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

Figure 7:
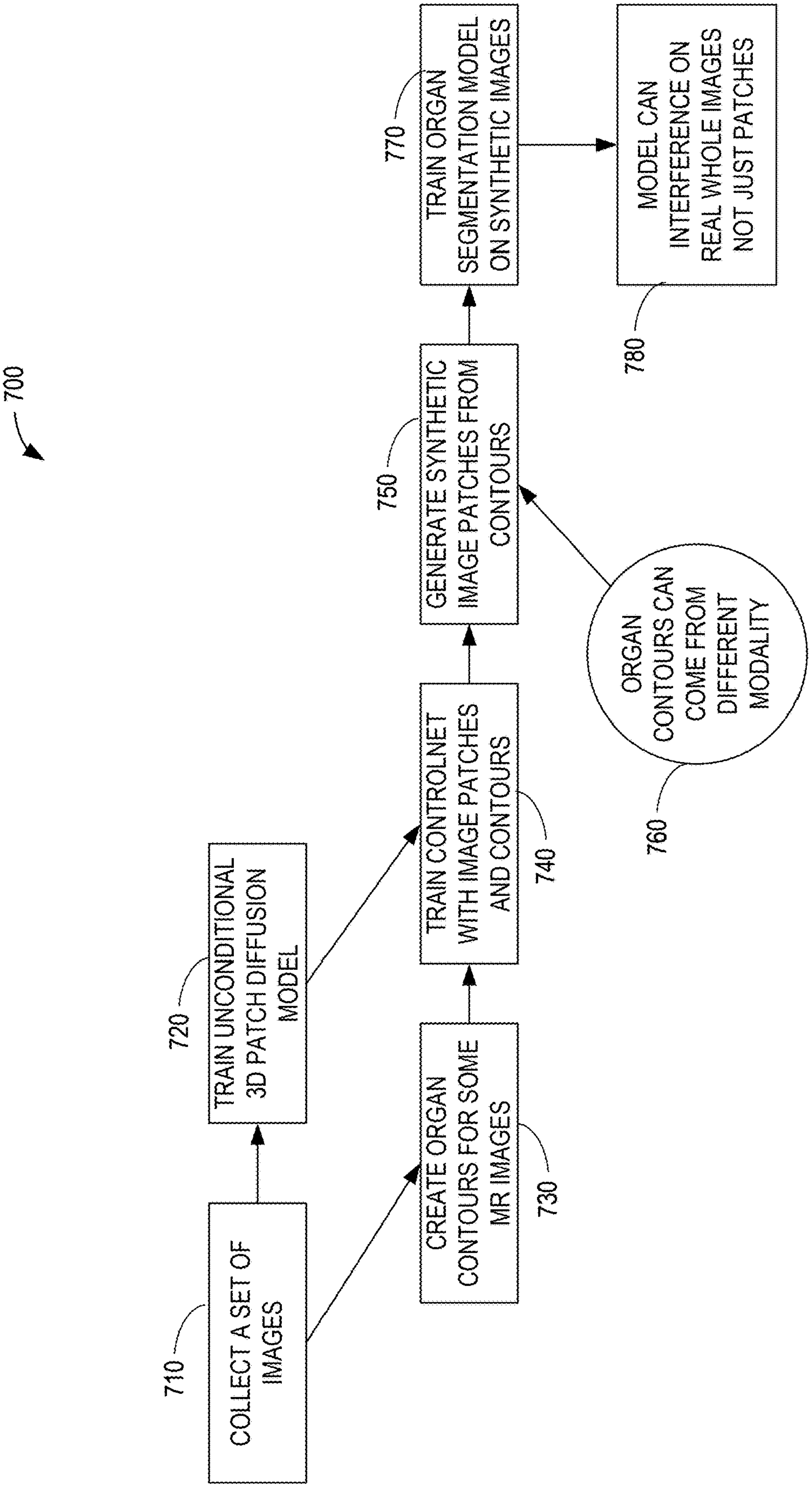
FIG. 7 is a flow diagram of an example method to train and deploy a diffusion model for synthetic image generation (and image segmentation).

FIG. 7 is a flow diagram of an example method 700 to train and deploy a diffusion model for synthetic image generation (and image segmentation). At block 710, a set of 3D images 102 is collected. For example, a set of 3D MR images is collected to train the diffusion model 115. The set of images is unlabeled and uncontoured, for example. The set of training/testing images can include images of a variety of organs, for example.

At block 720, the unconditional patch diffusion model 115 is trained using the set of images 102. For example, the unconditional diffusion model 115 learns from images without identified contours or labels. The unconditional diffusion model 115 learns from a large set of 3D images (e.g., 100-200 unlabeled 3D images, 300 3D unlabeled images, etc.). While uncontoured, the set of training images can include a variety of organs and/or other structures (e.g., 12 organs, 15 organs, 20 organs, etc.). The unconditional diffusion model 115 is modality agnostic and can learn from any image (e.g., CT, MR, US, natural image, point cloud, etc.).

For example, a set of original images of dimensions [256, 256, ~200] (e.g., 256×256 pixels in x-y direction and the z direction (slices) varied around 200) is processed to create image patches with dimensions [128, 128, 64]. The original images can be scaled (e.g., between [−1,1], etc.) before patches are created. In this example, image patches are created starting from the top left corner of the full image and moving with a sliding window to create a plurality of image patches which are overlapped by 32 pixels in each direction. Alternatively, random image patches can be generated from full original images. However, pre-cut, overlapping patches can exhibit faster convergence in model training versus random image patches. The unconditional diffusion model 115 can then be formed as a series of connected convolutional layers in a convolutional neural network and/or other artificial intelligence model generated and trained (e.g., over a series of time steps in a scaled linear beta, etc.) as a combination of encoder (down-sampling) and decoder (up-sampling) portions, for example.

At block 730, organ and/or other contours are created for at least a subset of images. For example, an additional set of 3D images (e.g., smaller than the initial set of uncontoured/unlabeled images) with contours can be collected. Alternatively or additionally, a subset of the training/testing set of 3D images 102 is processed to add organ contour(s) to the subset of images. The contoured images 122 can then be used to fine-tune the diffusion model 115.

At block 740, the fine-tuned diffusion model 125 is formed from the unconditioned diffusion model 115 by modifying the unconditioned diffusion model 115 with a conditioned diffusion model, such as ControlNet, etc., and training that model on the contours/contoured images 122. A conditional diffusion model 125 is then formed. The conditional diffusion model 125 is also modality agnostic, for example, but as the model 125 learns from contours and images, the model 125 is trained with contours from the same modality. The trained model 125 can then process contours made for different modalities to generate a desired type of synthetic image patches. Contours can include organ, anatomic, and/or other normal contours, tumor, anomaly, and/or other abnormal contours, etc.

For example, contours may have integer values such that a body is represented as 1s in a 128×128×128 image, while background is represented with 0s. Then the contour will have the same representation regardless of whether the original image was an MR or CT image, for example. As such, the conditional diffusion model 125 can be trained on hand-drawn contours apart from any underlying modality as long as the organ matches.

In certain examples, the conditional diffusion model 125 can be formed and trained as described above with respect to the unconditional diffusion model 115 but with the addition of cutting of label maps (contours) as well as image data. As such, image patches with contours can be formed (e.g., randomly and/or based on a sliding window overlapping across a (scaled) full image, etc.). The conditional diffusion model 125 can then be formed as a series of connected convolutional layers in a convolutional neural network and/or other artificial intelligence model generated and trained as a combination of encoder (down-sampling) and decoder (up-sampling) portions, for example.

At block 750, the fine-tuned, conditioned diffusion model 125 is deployed to generate synthetic 3D image patches using contours, which can be the contours 122, 132 and/or other organ contours 760, which can come from the same and/or a different modality than the modality on which the diffusion model 125 was trained.

At block 770, synthetic 3D image patches generated by the diffusion model 125 are output to train the organ segmentation model 145 (e.g., unet, nnunet, etc.). The synthetic image patches can be generated as if there were random and/or overlapping, windowed portions of a full image, as described above, for example. The synthetic 3D image patches have sufficient detail to train the organ segmentation model 145 without requiring storage of the entire image volume. At block 780, the segmentation model 145 is deployed and inference on real, whole 3D image volumes, not just image patches. As such, reduced image patches can be synthetically generated and used effectively to train the segmentation model 145 to be at least as accurate as a segmentation model trained on real images. The segmentation model 145 can then be used to inference on and segment whole images based on learning from the image patches.

As such, certain examples provide organ segmentation and tumor and/or other abnormality detection using a limited amount of data and more limited number of cases that are labeled. While traditional algorithms require a large amount of labeled image data, certain examples use a combination of a first, larger number of unlabeled/uncontoured images to develop a diffusion model that is fine-tuned with a second, smaller number of labeled/contoured images. Image patches (e.g., portions or subsets of a whole image) are generated and used to train and tune the diffusion model, and the resulting model can be used to generate whole images, image patches, etc. The diffusion model can be trained on one or more modalities (e.g., CT, MR, US, X-ray, etc.). The unconditional diffusion model can generate a variety of new, synthetic images. The conditioned, fine-tuned diffusion model is trained to generate a certain type of 2D and/or 3D image that fits within provided organ contours. By using only image patches to train the unconditioned diffusion model, the training/testing data set can fit in memory (e.g., GPU memory, etc.). A smaller number of contoured images enables the resulting model to generate a practically infinite number of new images that are different and yet fit the prescribed contour(s). As such, the model can learn from image patches (e.g., 1-2 magnitudes less in size than a full image, etc.) but inference on an entire image volume.

Certain examples enable model development from multiple modalities, such as conditioning a diffusion model trained to generate MR images using organ contours from CT images. The resulting model can generate MR images that are consistent with those contours. Abnormal structures (also referred to herein as abnormalities), such as tumors, etc., can be added by the tuned, conditioned diffusion model while keeping the "normal" anatomy in its typical location(s). Abnormal structures can be generated and/or transferred from existing images as well. The fine-tuned, conditioned diffusion model can move structures between images, such as moving a tumor from a left kidney to a right kidney, for example.

Certain examples replace manual annotation of images with the contoured synthetic image generation. Generating realistic patches with contours is sufficient to train the segmentation model. As described and disclosed herein, patches do not need to be reassembled into a full image volume for segmentation training. By training the organ segmentation model on both real and synthetic images from a data set, the segmentation model can achieve better results with the synthetic images. The synthetic image patches generated by the fine-tuned, conditioned diffusion model are approximately equal to the real images but with much less annotation.

The diffusion and segmentation models can be trained for a plurality of imaging modalities. For example, MR and CT images depict large portions of anatomy with large structures having contours. Both T1 and T2 MR images depict entire anatomy at high resolution. Ultrasound images tend to be smaller, closer images with fewer objects in a smaller field of view. All such images can be synthetically generated by the diffusion model and segmented by the segmentation model.

For example, T1w MR images can be used to generate synthetic T1w MR images, and organ contours from T2w MR images are used to perfect the T1w MR images. Synthetic T1w MR image patches are generated from random noise and reconditioned with one or more contours from T2w MR images to ensure that the synthetic T1w MR images are compatible with the domain. In another example, synthetic CT images, etc., can be conditioned with contours taken from T2w MR images. Both 2D images and 3D image volumes can be synthetically generated (e.g., with a tuned, hybrid DDPM+ControlNet diffusion model, etc.). A large number of organs (e.g., 14, 20, 20+ organs, etc.) can be contoured, abnormal structures positioned within those contours, and the synthetic 3D image patches generated include small details as real images do but accommodate the technical limitations of available memory (e.g., GPU memory).

Thus, certain examples overcome the technological limitations of memory circuitry available to train an artificial intelligence model, such as an organ segmentation model, a diffusion model, etc. Certain examples enable image patches, rather than full images, to be conditioned for use in model training. Certain examples generate synthetic image patches that are at least as effective as full real images in training an organ segmentation model. Certain examples provide a framework that is flexible in training diffusion and segmentation models across a variety of modalities, including mixing of modalities for model training. As such, organ segmentation models can quickly be adapted to new input image type(s) to extend the scope of segmentation products.

Synthetic images can be generated with elements and combinations that do not occur in real life. Segmentation models trained with these novel synthetic data are more accurate and more robust than models trained on real images (e.g., actual images obtained from one or more patients) alone. Synthetic images do not suffer from overfitting or biases, caused for limited real datasets. The patch-based approach eliminates the need for training diffusion models that can generate high-resolution 3D images.

Figure 8:
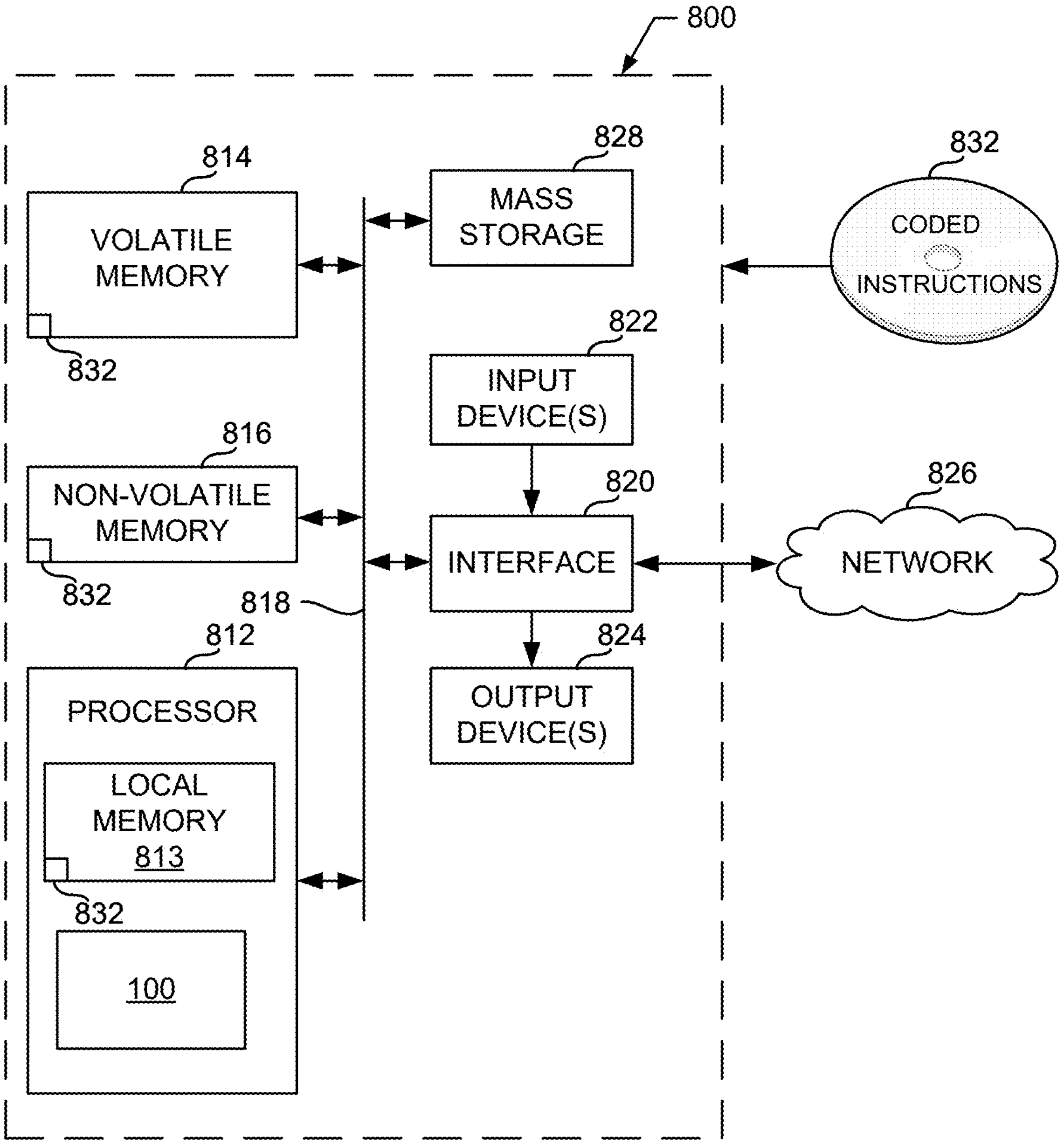
FIG. 8 is a block diagram of an example processor platform structured to execute the instructions of FIG. 7 to implement, for example, the example system of FIGS. 1-6.

FIG. 8 is a block diagram of an example processor platform 800 structured to execute the instructions of FIG. 7 to implement, for example, the example system 100 of FIGS. 1-6. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a gaming console, a personal video recorder, a set top box, a headset or other wearable device, or any other type of computing device.

The processor platform 800 of the illustrated example includes a processor or processor circuitry 812. The processor circuitry 812 of the illustrated example is hardware. For example, the processor circuitry 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor circuitry 812 and associated memory implement all or part of the example system 100.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by SDRAM, DRAM, RDRAM®, and/or any other type of random access memory device. The non-volatile memory 816 may be implemented by flash memory and/or any other desired type of memory device. Access to the main memory 814, 816 is controlled by a memory controller. The memory 813, 814, and/or 816 can be referred to herein as memory circuitry.

The processor platform 800 of the illustrated example also includes an interface circuit 820. The interface circuit 820 may be implemented by any type of interface standard, such as an Ethernet interface, a USB, a Bluetooth® interface, an NFC interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint, and/or a voice recognition system.

One or more output devices 824 are also connected to the interface circuit 820 of the illustrated example. The output devices 824 can be implemented, for example, by display devices (e.g., an LED, an OLED, an LCD, a CRT display, an IPS display, a touchscreen, etc.), a tactile output device, a printer, and/or speaker. The interface circuit 820 of the illustrated example, thus, typically includes a graphics driver card, a graphics driver chip, and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a DSL connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and DVD drives.

The machine executable instructions 832 to implement the example process 700 of FIG. 7 may be stored in the mass storage device 828, in the volatile memory 814, in the non-volatile memory 816, and/or on a removable non-transitory computer readable storage medium such as a CD or DVD.

From the foregoing, it will be appreciated that example methods, apparatus and articles of manufacture have been disclosed that enable generation of synthetic 2D and 3D image patches. The disclosed apparatus, systems, methods, and articles of manufacture enable not only such image patches to be generated but also used to train and deploy an organ segmentation model. As such, certain examples improve the capabilities, efficiency, and effectiveness of processor system, memory, and other associated circuitry by leveraging artificial intelligence models and image patches to inference on full images while reducing memory usage, which has been a barrier to making such processing a reality. The disclosed methods, apparatus and articles of manufacture are accordingly directed to one or more improvement(s) in the functioning of a computer and/or other processor and its associated interface. The apparatus, methods, systems, instructions, and media disclosed herein are not implementable in a human mind and are not able to be manually implemented by a human user.

Trained, tuned, conditional diffusion models can be used to generate both 2D and 3D synthetic image generation. While 2D images have much fewer pixels (e.g., 512×512 pixels, etc.), 3D image volumes have a much larger number of pixels (e.g., 512×512×512, etc.). While an entire 2D image will fit in the largest commercially available GPU, a 3D image volume cannot fit in such memory. As such, certain examples use 3D image patches. The unconditional model can generate 3D image patches of an image volume (e.g., 128×128×128 from a 512×512×512 volume, etc.) from noise, and the conditional model can generate 3D image patches from contours. The segmentation model can learn from image patches, rather than the full image. However, once the segmentation model is trained on the image patches, the segmentation model can inference on whole 3D images of any size. As such, certain examples generate synthetic 3D image patches from contours, generate a plurality of synthetic 3D image patches many of them by augmenting the contours, and then train a segmentation model that can learn from the synthetic 3D image patches and inference on an entire/complete image.

Further disclosure is provided in the following clauses:

An example model generation system is disclosed including: memory circuitry; instructions in the memory circuitry; and processor circuitry to execute the instructions to at least: train a first diffusion model using a first set of images without contours; fine-tune the first diffusion model using a second set of images with contours to form a second diffusion model, wherein the second set of images is smaller than the first set of images; generate synthetic image patches with contours using the second diffusion model and at least one contour; train a segmentation model using the synthetic image patches; and deploy the segmentation model to inference on a third set of images.

The model generation system of any preceding clause can include implementations wherein the first diffusion model is an unconditioned diffusion model, and wherein the second diffusion model is a fine-tuned, conditioned diffusion model.

The model generation system of any preceding clause includes implementations wherein the synthetic image patches include synthetic three-dimensional image patches.

The model generation system of any preceding clause includes implementations wherein the synthetic image patches are 1-2 orders of magnitude less in size than full images.

The model generation system of any preceding clause includes implementations wherein the first set of images is obtained using at least a first modality, and wherein the second set of images is obtained using at least a second modality.

The model generation system of any preceding clause includes implementations wherein the first modality and the second modality include magnetic resonance imaging and computed tomography imaging.

The model generation system of any preceding clause includes implementations wherein the first set of images includes a first set of image patches.

The model generation system of any preceding clause includes implementations wherein the second diffusion model is to include an abnormality in the synthetic image patches.

The model generation system of any preceding clause includes implementations wherein at least one of the contours in the second set of images is obtained using augmentation.

The model generation system of any preceding clause includes implementations wherein the augmentation includes at least one of a normal contour or an abnormal contour.

At least one tangible computer-readable storage medium is disclosed including instructions that, when executed, cause at least one processor to at least: train a first diffusion model using a first set of images without contours; fine-tune the first diffusion model using a second set of images with contours to form a second diffusion model; generate synthetic image patches with contours using the second diffusion model and at least one contour; train a segmentation model using the synthetic image patches; and deploy the segmentation model to inference on a third set of images.

The at least one tangible computer-readable storage medium of any preceding clause includes implementations wherein the first diffusion model is an unconditioned diffusion model, and wherein the second diffusion model is a fine-tuned, conditioned diffusion model.

The at least one tangible computer-readable storage medium of any preceding clause includes implementations wherein the synthetic image patches include synthetic three-dimensional image patches.

The at least one tangible computer-readable storage medium of any preceding clause includes implementations wherein the first set of images is obtained using at least a first modality, and wherein the set of contours is obtained using at least a second modality.

The at least one tangible computer-readable storage medium of any preceding clause includes implementations wherein the first set of images includes a first set of image patches.

The at least one tangible computer-readable storage medium of any preceding clause includes implementations wherein the second diffusion model is to include an abnormality in the synthetic image patches.

A segmentation apparatus is disclosed including: a first diffusion model trained using a first set of images without contours; a second diffusion model formed from the first diffusion model tuned using a second set of images with contours, the second diffusion model to generate synthetic image patches with contours using at least one contour; and a segmentation model trained using the synthetic image patches and deployed to inference on a third set of images.

The segmentation apparatus of any preceding clause includes implementations wherein the first diffusion model is an unconditioned diffusion model, and wherein the second diffusion model is a fine-tuned, conditioned diffusion model.

The segmentation apparatus of any preceding clause includes implementations wherein the synthetic image patches include synthetic three-dimensional image patches.

The segmentation apparatus of any preceding clause includes implementations wherein the first set of images is obtained using at least a first modality, and wherein the set of contours is obtained using at least a second modality.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A model generation system comprising:
memory circuitry;
instructions in the memory circuitry; and
processor circuitry to execute the instructions to at least:
train a first diffusion model using a first set of images without contours, the first diffusion model being an unconditioned diffusion model;
fine-tune the first diffusion model using a second set of images with contours to form a second diffusion model, wherein the second set of images is smaller than the first set of images, and wherein fine-tuning comprises conditioning the first diffusion model with a contour label map that is independent of image intensity and imaging modality;
generate synthetic image patches with contours using the second diffusion model and at least one contour, wherein the at least one contour is derived from a first imaging modality and the synthetic image patches correspond to a second imaging modality different from the first imaging modality;
train a segmentation model using the synthetic image patches; and
deploy the segmentation model to inference on a third set of images.

2. The model generation system of claim 1, wherein the synthetic image patches include synthetic three-dimensional image patches.

3. The model generation system of claim 2, wherein the synthetic image patches are 1-2 orders of magnitude less in size than full images.

4. The model generation system of claim 1, wherein the first set of images is obtained using at least a first modality, and wherein the second set of images is obtained using at least a second modality.

5. The model generation system of claim 4, wherein the first modality and the second modality include magnetic resonance imaging and computed tomography imaging.

6. The model generation system of claim 1, wherein the first set of images includes a first set of image patches.

7. The model generation system of claim 1, wherein the second diffusion model is to include an abnormality in the synthetic image patches.

8. The model generation system of claim 1, wherein at least one of the contours in the second set of images is obtained using augmentation.

9. The model generation system of claim 8, wherein the augmentation includes at least one of a normal contour or an abnormal contour.

10. At least one tangible computer-readable storage medium comprising instructions that, when executed, cause at least one processor to at least:
train a first diffusion model using a first set of images without contours, the first diffusion model being an unconditioned diffusion model;
fine-tune the first diffusion model using a second set of images with contours to form a second diffusion model, and wherein fine-tuning comprises conditioning the first diffusion model with a contour label map that is independent of image intensity and imaging modality;
generate synthetic image patches with contours using the second diffusion model and at least one contour, wherein the at least one contour is derived from a first imaging modality and the synthetic image patches correspond to a second imaging modality different from the first imaging modality;
train a segmentation model using the synthetic image patches; and
deploy the segmentation model to inference on a third set of images.

11. The at least one tangible computer-readable storage medium of claim 10, wherein the synthetic image patches include synthetic three-dimensional image patches.

12. The at least one tangible computer-readable storage medium of claim 10, wherein the first set of images is obtained using at least a first modality, and wherein the second set of images with contours is obtained using at least a second modality.

13. The at least one tangible computer-readable storage medium of claim 10, wherein the first set of images includes a first set of image patches.

14. The at least one tangible computer-readable storage medium of claim 10, wherein the second diffusion model is to include an abnormality in the synthetic image patches.

15. A segmentation apparatus comprising:
a first diffusion model trained using a first set of images without contours, the first diffusion model being an unconditioned diffusion model;
a second diffusion model formed from the first diffusion model tuned using a second set of images with contours, the second diffusion model to generate synthetic image patches with contours using at least one contour, wherein the at least one contour is derived from a first imaging modality and the synthetic image patches correspond to a second imaging modality different from the first imaging modality, and wherein the first diffusion model is fine-tuned by conditioning the first diffusion model with a contour label map that is independent of image intensity and imaging modality; and
a segmentation model trained using the synthetic image patches and deployed to inference on a third set of images.

16. The segmentation apparatus of claim 15, wherein the synthetic image patches include synthetic three-dimensional image patches.

17. The segmentation apparatus of claim 15, wherein the first set of images is obtained using at least a first modality, and wherein the second set of images with contours is obtained using at least a second modality.

* * * * *